Sept. 23, 1958 J. R. PERILHOU 2,853,547

TELEVISION CAMERA DEVICE

Filed Dec. 22, 1954 2 Sheets-Sheet 1

INVENTOR
JEAN ROBERT PERILHOU
BY [signature]
AGENT

INVENTOR
JEAN ROBERT PERILHOU
BY
AGENT

United States Patent Office 2,853,547

Patented Sept. 23, 1958

2,853,547

TELEVISION CAMERA DEVICE

Jean Robert Perilhou, Bourg la Reine, France, assignor, by mesne assignments, to North American Philips Company, Inc., New York, N. Y., a corporation of Delaware Application December 22, 1954, Serial No. 476,963

Claims priority, application France February 23, 1954

5 Claims. (Cl. 178—5.4)

This invention relates to camera devices for producing television information signals, in which the different colours of an object to be analysed are dissociated into plural colours, usually three primary colours.

The invention relates more particularly to devices in which television information signals are produced with the use of one pick up tube which is suitable for light scanning and which comprises an optical system constituted by a lens system projecting the light emanating from an object to the photo-electric cathode of the pick-up tube, a colour filter dissociating the light emanating from an object into different colour components, and suitable optical means producing images of the said colour components on individual parts of the photo-electric cathode.

The object of the invention is to construct the said devices in such manner as to fulfill better than hitherto the different requirements in practice.

The device according to the invention to this end is characterized in that a number of punctiform light sources are provided equal to the number of colour components into which the light emanating from the object is simultaneously dissociated, which light sources under the action of suitable deflection means describe at least parts of the image raster used in television, whereby in addition images of the light sources, which with the use of suitable switching elements alternately emit light, are produced on individual parts of the photo-electric cathode by way of the said optical means.

Figure 2:
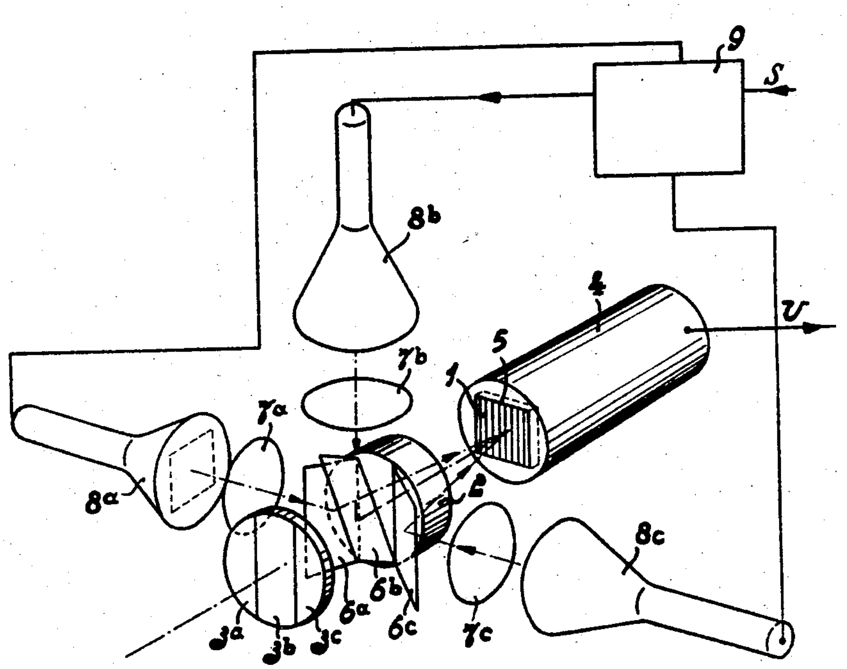
Figure 1:
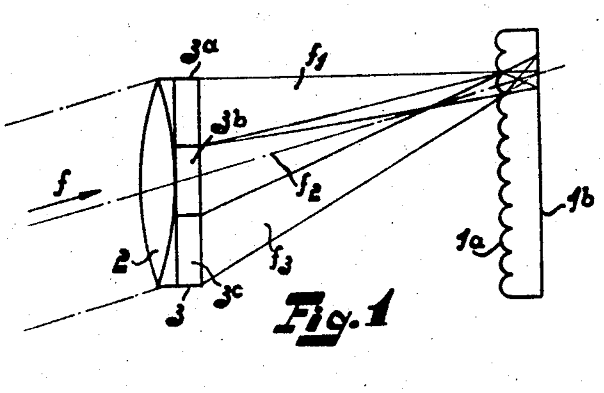
Figure 3:
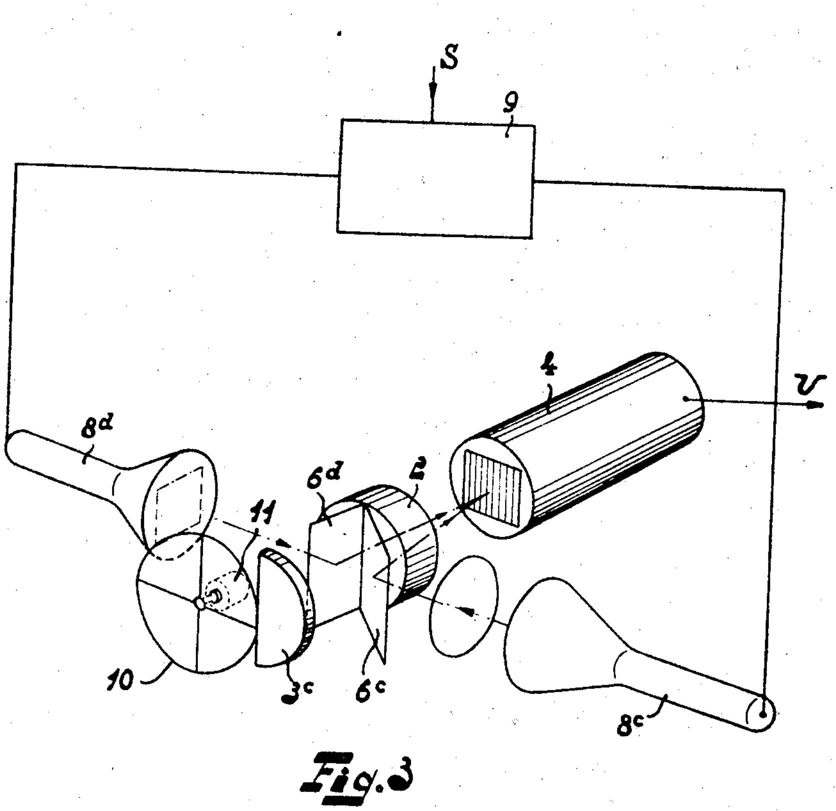

In order that the invention may be readily carried into effect, it will now be described, by way of example, with reference to the accompanying drawings, in which Fig. 1 shows a known optical system which can be used with the invention and Figs. 2 and 3 are embodiments of devices according to the invention.

Fig. 1 shows a known optical system which can be used with the invention, the system comprising an objective 2, a color filter 3, and an element 1, comprising a plurality of parallel half cylinders 1*a* and having a flat rear surface 1*b*. The filter 3 comprises three parts 3*a*, 3*b*, 3*c*, each of which can transmit a determined primary colour, for example 3*a* can transmit blue, 3*b* green and 3*c* red. The light beam $f$ emanating from an object is simultaneously divided or separated by the filter into three emerging light beams $f_1$, $f_2$, $f_3$ corresponding to the said colour components noted above. Due to the presence of the element 1, an image point corresponds to each direction of the beam $f$ on a photo-electric cathode provided at the area of the flat rear surface 1*b*. It will thus be evident that the three beams $f_1$, $f_2$, $f_3$ produce three adjacent image points each of a different colour, and all resulting from the beam $f$ from a single object point.

It is noted that optical means having a similar effect as the element 1 may be used as well with the invention. By way of example, we may mention a transparent plate of which the front side is provided with opaque parallel streaks with only a small spacing between them.

In the embodiment of a device according to the invention as shown in Fig. 2, use is made of such an optical system. The element 1 is positioned with its flat rear surface either against or in the vicinity of the photo-electric cathode 5 of a pick-up tube 4 which is suitable for light scanning. The light emanating from an object is projected on the photo-electric cathode 5 by the objective 2. Furthermore, in a similar manner as in Fig. 1, filters 3*a*, 3*b*, and 3*c* are added to the objective 2.

Said optical system is provided, for the partial filters 3*a*, 3*b*, 3*c*, with semi-transparent or dichroid mirrors 6*a*, 6*b*, 6*c* (or equivalent prisms) at an angle of 45° with the axis of the system, and also with lenses 7*a*, 7*b*, 7*c* and cathode-ray tubes 8*a*, 8*b*, 8*c*, which are positioned in such manner that the images of these tubes in the absence of the element 1 substantially overlap on the photo-electric cathode 5 of the pick-up tube.

Under these conditions images of the object to be analysed are produced on the photo-electric cathode 5 in a similar manner as with the system shown in Fig. 1, that is to say dissociated or separated into three adjacent colour spots. On the other hand, if a light spot is moved across the screen of each cathode-ray tube with the use of means known per se, during the production of light rasters, each of the light spots can produce an image only on those parts of the photo-electric cathode 5 which correspond to the direction of incidence of the light of the light spot concerned upon the element 1. If the direction of the light of a determined light spot always corresponds to a direction of the light emanating from the object, which light passes through a determined part of the filter, such a light spot invariably scans colour spots on the photo-electric cathode of the same colour. Thus, if the light spot on one of the cathode-ray tubes, for example that corresponding to the green filter, moves across the screen of the said tube, its image will move from a green image spot to another green image spot on the photo-electric cathode.

As is well-known, the scanning operation, thus effected by an image point, results in emission of electrons towards the anode and hence in an anode current corresponding to the charge accumulated on the anode during the time interval between two scannings. This current is dependent upon the strength of the optical image thus analysed. Said scanning mechanism replaces the conventional cathode ray.

If a switching member 9 is added to the three cathode-ray tubes 8*a*, 8*b*, 8*c*, the signals of one or another primary colour may be chosen arbitrarily and thus be successively emitted at will.

Fig. 3 shows another embodiment which may be regarded as deduced from the preceding by changing the two tubes 8*a* and 8*b* for one tube 8*d*. A rotary filter 10 having at least a blue sector and a red sector is driven by a suitably synchronized electric motor 11, the fixed green filter 3*c* covering one half of the objective 2 and the other half being covered alternately by the blue filter and the red filter. There are now only two image spots per cylindrical element, and only two colour components being simultaneously formed.

From the above description it appears that the devices according to the invention permit the images of the various pick-up tubes to be superposed as accurately as possible, since each point of the object or scene to be reproduced provides on the cathode three spots which approach one another sufficiently to be seen by the eye as a whole, provided a composite lens is used having as thin cylindrical elements as possible, for example of 0.05 mm. or 50 microns.

For a standard of 600 lines use may be made of 600 cylindrical lenses, corresponding to a width of the photo-electric cathode of 3 cms., which is quite reasonable in practice.

The devices according to the invention also have a very uniform sensitivity throughout the surfaces of the images corresponding to the various primary colours, which leads to images of uniform sharpness being received.

Furthermore, it is noted that the fluorescent or phosphorescent layers of the screens of the various cathode-ray tubes may have any arbitrary colour, since the colours do not affect the method according to the invention.

Numerous modifications in the embodiment above described are possible within the scope of the present invention.

The pick-up devices according to the invention produce signals (received at U, Figs. 2 and 3), which are of the sequential type, that is to say the signals of the various primary colours succeed one another in a circular alternation. This alternation is controlled by the signals supplied at S (Figs. 2 and 3) to the switch 9, which signals may have video-frequency or line frequency.

What is claimed is:

1. A color television camera comprising a pick-up tube including a photo-cathode and adapted for light scanning, color filter means mounted in the light path from an object to be televised to said photo-cathode for simultaneously separating said light into a plurality of individual color components, optical means mounted in the light path from the object to said photo-cathode for forming on the latter separate images for each of the color components whereby each point of the object is represented on the photo-cathode by a plurality of spaced image points equal in number to the number of individual color components simultaneously formed, a plurality of punctiform light sources equal in number to the number of individual color components simultaneously formed and adapted to produce a light raster, and means associated with said light sources for projecting the rasters onto the photo-cathode in such manner that each of said light rasters is in registration with one of the series of image points representing one of said color components.

2. A color television camera as set forth in claim 1 wherein said last-named means includes semi-transparent mirrors.

3. A color television camera device comprising a single pick-up tube having a photo-cathode and adapted for light scanning, color filter means mounted in the light path from an object to be televised to said photo-cathode for simultaneously separating said light from the object into a plurality of primary colors, optical means mounted in said light path between the color filter and the photo-cathode for forming on the latter separate, spaced images of each of the primary colors whereby each point of the object is represented on the same photo-cathode by a plurality of spaced image points equal in number to the number of primary colors simultaneously formed, a plurality of flying spot scanners equal in number to the number of primary colors simultaneously formed and each producing a light raster, means for projecting the light rasters of said flying spot scanners onto the said photo-cathode without traversing said color filter and in such manner that each light raster only registers with the series of image points representing a single one of said primary colors, whereby each light raster causes only points of the photo-cathode illuminated by light of a particular primary color to emit electrons, and switching means coupled to said flying spot scanners for succesively exciting the same.

4. A color television camera device as set forth in claim 3 wherein the color filter separates the light into three primary colors.

5. A color television camera device as set forth in claim 3 wherein two flying spot scanners are provided, and a rotatable color filter member is provided in the light path between the object and the photo-cathode.

References Cited in the file of this patent

UNITED STATES PATENTS

| | | |
|---|---|---|
| 2,479,820 | De Vore | Aug. 23, 1949 |
| 2,545,957 | Kell | Mar. 20, 1951 |
| 2,552,070 | Sziklai | May 8, 1951 |
| 2,579,971 | Schade | Dec. 25, 1951 |
| 2,595,553 | Weimer | May 6, 1952 |
| 2,672,502 | Albright | Mar. 16, 1954 |
| 2,705,258 | Lesti | Mar. 29, 1955 |